(12) United States Patent
Teller et al.

(10) Patent No.: US 6,816,437 B1
(45) Date of Patent: Nov. 9, 2004

(54) METHOD AND APPARATUS FOR DETERMINING ORIENTATION

(75) Inventors: Seth J. Teller, Cambridge, MA (US); Nissanka B. Priyantha, Somerville, MA (US); Allen K. L. Miu, Cambridge, MA (US); Hari Balakrishnan, Winchester, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 10/198,625

(22) Filed: Jul. 17, 2002

Related U.S. Application Data
(60) Provisional application No. 60/385,619, filed on Jun. 3, 2002.

(51) Int. Cl.[7] .............................................. G01S 3/808
(52) U.S. Cl. ..................... 367/125; 367/124; 367/129
(58) Field of Search ................................ 367/124, 125, 367/129; 702/150; 340/870.41

(56) References Cited

U.S. PATENT DOCUMENTS

| | | | | |
|---|---|---|---|---|
| 2,557,900 A | * | 6/1951 | Wallace, Jr. et al. ......... | 367/129 |
| 3,121,228 A | * | 2/1964 | Kalmus ......................... | 367/99 |
| 3,559,161 A | * | 1/1971 | Raudsep ....................... | 367/125 |
| 3,658,427 A | * | 4/1972 | DeCou ................... | 356/139.03 |
| 3,745,518 A | * | 7/1973 | Barret et al. ................. | 367/125 |
| 5,495,427 A | * | 2/1996 | Puma et al. ................. | 367/125 |

OTHER PUBLICATIONS

Adjie–Winoto, W., et al. "The Design of Implementation of an Intentional Naming System," In *Proc. ACM Symposium on Operatig Systems Principles* (Kiawah Island, SC, Dec. 1999), pp. 186–201.

Ascension Technology. http://www.ascension–tech.com/ (2000).

Northern Digital Inc. —ProductsAURORA. http://www.n-digital.com/aurora.html (2001).

Azuma, R. "Tracking Requirements for Augmented Reality," *Comm. of the ACM*, 7 (Jul. 1993), 50–55.

Bahl, P., et al, "RADAR: An In–Building RF–Based User Location and Tracking System," In *Proc. IEEE INFOCOM* (Tel–Aviv, Israel, Mar. 2000).

Bulusu, N., et al. "GPS–Less Low Cost Outdoor Localization For Very Small Devices," Tech. Rep. 00–729, Computer Science Department, University of Southern California, Apr. 2000.

CoolTown. http://www.cooltown.hp.com/ (2000).

Czerwinski, S., et al. "An Architecture for a Secure Service Discovery Service," In *Proc. 5th ACM MOBICOM Conf.* (Seattle, WA, Aug. 1999), pp. 24–35.

Doherty, L., et al. "Convex Position Estimation in Wireless Sensor Networks," In *Proc. IEEE INFOCOM* (Apr. 2001).

Foxlin, E., et al. "Constellation: A Wide–Range Wireless Motion–Tracking System for Augmented Reality and Virtual Set Applications," In *Proc. ACM SIGGRAPH* (Orlando, FL, Jul. 1998).

(List continued on next page.)

*Primary Examiner*—Ian J. Lobo
(74) *Attorney, Agent, or Firm*—Hamilton, Brook, Smith & Reynolds, P.C.

(57) ABSTRACT

The position and orientation of a mobile unit is determined from ultrasonic waves received from beacons of known location. Orientation is determined from a phase difference of the sensed ultrasonic wave at plural receivers on the mobile unit. Signals from multiple beacons may be processed to solve for x, y and z position and for speed of sound. The receivers are spaced at greater than a half wavelength of the ultrasonic wave and signals from plural receivers are processed to remove multiple wavelength phase ambiguity. Two non-collinear sets of collinear receivers allow ambiguity resulting from symmetry of the receivers to be broken.

51 Claims, 8 Drawing Sheets

OTHER PUBLICATIONS

Getting, I. "Global Positioning System," *IEEE Spectrum 30*, 12 (Dec. 1993), 36–47.

Goland, Y, et al. Simple Service Discovery Protocol/1.0. http://search.ietf.org/internet–drafts/draft–cai–ssdp–v1–02.txt, Jun. 1999. Internet Draft, expires Dec. 1999.

Harter, A., et al. "The Anatomy of a Context–Aware Application," In *Proc 5th ACM MOBICOM Conf.* (Seattle, WA, Aug. 1999).

Kindratenko, V. "Calibration of Electromagnetic Tracking Devices." *Virtual Reality: Research, Development, and Applications 4* (1999), 139–150.

Oxygen home page. http://oxygen.lcs.mit.edu/.

Pinpoint home page. http://www.pinpointco.com/.

Privacy International Survey. http://www.privacyinternational.org/survey/technologies.html.

Priyantha, N., et al. "The Cricket Location–Support System," In *Proc. 6th ACM MOBICOM Conf.* (Boston, MA, Aug. 2000).

Roumeliotis, S., et al., "Smoother–Based 3–D Attitude Estimation for Mobile Robot Localization," In *Proc. IEEE International Conf. on Robotics and Automation* (Detriot, MI, May 1998).

Schilit, B., et al. "Disseminating Active Map Information to Mobile Hosts," *IEEE Network* (Sep./Oct. 1994) 22–32.

Polhemus Star Trak. http://www.polhemus.com/stardstech.htm (2000).

Turunen, T., et al. "Utilisation of Wireless Application Protocol to Implement Mobile Augmented Reality Based Services," In *Proc. W3C and WAP Workshop on Position Dependent Information Services* (Feb. 2000). Available from http://www.w3.org/Mobile/posdep/0ulu.html.

Want, R., et al. "The Active Badge Location System," *ACM Transactions on Information Systems 10*, 1 (Jan. 1992), 91–102.

Ward, A., et al. "A New Location Technique for the Active Office," *IEEE Personal Comm.4*, 5 (Oct. 1997), 42–47.

Welch, G., et al. "The HiBall Tracker:High–Performance Wide–Area Tracking for Virtual and Augmented Environments," In *Proc. of the ACM Technology* (Dec. 1999).

Werb, J., et al. "Designing a Positioning System for Finding Things and People Indoors," *IEEE Spectrum 35*, 9 (Sep. 1998), 71–78.

Arai, T., et al. "Development of Measuring Equipment for Location and Direction (MELODI) Using Ultrasonic Waves," In *Journal of Dynamic Systems, Measurement and Control 105*, 3 (Sep. 1983), 152–156.

Wu, J., et al. "Rapid and Accurate Inter–Robot Position Determination in Robot Teams," *IEEE Transactions on Instrumentation and Measurement 50*, 1 (Feb. 2001), 163–168.

Nakajima, S., et al. "An Ultrasonic Orientation Sensor with Distributed Receivers," In *Advanced Robotics 4*, 2 (1990), 151–168.

Morris, A.S., et al. "An Enhanced Ultrasonic System for Robot End Effector Tracking," *Proc. of Control 91: Int. Conf. on Computer Control*, Edinburgh, (1991), 352–357.

Nakajima S. "Ultrasonic Proximity Sensor for Profile Following Work by Robot Manipulators—Measurment of the 3–D Orientation of a Robot Hand Using Phase Difference," *Trans. SICE 22*, 5 (1986), 567–573 (in Japanese).

Priyantha, N., et al. "Cricket Compass for Context–Aware Mobile Applications," *7th ACM Conf. Mobile Computing and Networking (MOBICOM)*, (Rome, Italy, Jul., 2001).

* cited by examiner

METHOD AND APPARATUS FOR DETERMINING ORIENTATION

RELATED APPLICATION

This application claims the benefit of U.S. Provisional Application No. 60/385,619, filed Jun. 3, 2002. The entire teachings of the above application are incorporated herein by reference.

BACKGROUND OF THE INVENTION

Context-aware applications, which adapt their behavior to environmental context such as physical location, are an important class of applications in emerging pervasive computing environments. Oxygen home page: http://oxygen.lcs.mit.edu. Examples include location-aware applications that enable users to discover resources in their physical proximity [Harter, A., Hopper, A., Steggles, P., Ward, A., and Webster, P. "The Anatomy of a Context-Aware Application". In *Proc. 7th ACM MOBICOM Conf.* (Seattle, Wash., August 1999)., Priyantha, N., Chakraborty, A., and Balakrishnan, H. "The Cricket Location-Support System." In *Proc. 6th ACM MOBICOM Conf.* (Boston, Mass., August 2000)], active maps that automatically change as a user moves [Schilit, B., and Theimer, M. "Disseminating Active Map Information to Mobile Hosts." *IEEE Network* (September/October 1994), 22–32.], and applications whose user interfaces adapt to the user's location. A significant amount of previous work has focused on providing device position capability indoors, including the Active Badge [Want, R., Hopper, A., Falcao, V., and Gibbons, J. "The Active Badge Location System." *ACM Transactions on Information Systems* 10, 1 (January 1992), 91–102.], Bat [Harter, A., Hopper, A., Steggles, P., Ward, A., and Webster, P. "The Anatomy of a Context-Aware Application." In *Proc. 7th ACM MOBICOM Conf.* (Seattle, Wash., August 1999).], RADAR [Bahl, P., and Padmanabhan, V. "RADAR: An In-Building RF-based User Location and Tracking System." In *Proc. IEEE INFOCOM* (Tel-Aviv, Israel, March 2000).], and Cricket [Priyantha, N., Chakraborty, A., and Balakrishnan, H. "The Cricket Location-Support System." In *Proc. 6th ACM MOBICOM Conf.* (Boston, Mass., August 2000).] systems.

In the Cricket system, several beacons in a room broadcast their location with RF signals. An ultrasonic wave is also transmitted from each beacon. Both waves from a beacon are detected at a mobile device and the difference in arrival times indicates the distance of the mobile unit from the beacon.

SUMMARY OF THE INVENTION

Whereas prior implementations of the Cricket system have enabled accurate location of a mobile device, they did not allow for detection of orientation of the device. Orientation is significant, for example, in application to a handheld controller. Both the location and orientation of the controller determine the fixed device within a room at which the controller is pointed and which is to be controlled.

The ability to determine the orientation of a device is of importance in context-aware and location-dependent mobile computing. By analogy to a traditional compass, knowledge of orientation through the Cricket compass attached to a mobile device enhances various applications, including efficient way-finding and navigation, directional service discovery, and "augmented-reality" displays. Our compass infrastructure enhances the spatial inference capability of the Cricket indoor location system, and enables new pervasive computing applications.

In a system in which a beacon on a first unit, such as a fixed ceiling, transmits a wave to be detected by a second unit, such as a mobile unit, plural receivers, each fixed relative to the second unit, sense the transmitted wave to provide plural sensed signals. A processor processes the sensed signals to specify orientation of the second unit relative to the beacon based on phase differences of the plural sensed signals.

In disclosed embodiments, the wave is an ultrasonic wave. Due to the short wavelength of the ultrasonic wave and the required spacing of practical receivers, a given observed phase difference can correspond to any number of actual phase differences all separated by $2\pi$. In order to resolve that ambiguity, the system comprises at least three receivers. It has been determined that by using at least three receivers in a line, with the receivers spaced by differences which are relatively prime integral multiples of the half wavelength of the ultrasonic wave, the ambiguity can be eliminated.

Due to symmetry of a single line of receivers, there can be an additional ambiguity between two potential directions. That ambiguity is resolved by providing two non-collinear sets of collinear receivers. In one implementation, each set of receivers comprises three collinear receivers, the sets of receivers being perpendicular to each other and sharing one receiver.

In one implementation, the specified orientation includes angular orientation within a plane offset from the beacon. For example, the plane may be a horizontal plane offset from the ceiling plane on which plural beacons are mounted.

Orientation may be based on phase differences of sensed signals from plural beacons and on position relative to each of the plural beacons. The position is determined from measured distances relative to each of the plural beacons.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

1. Introduction

An important aspect of context, which is related to physical position, is the orientation of a device (or user) with respect to one or more landmarks in a region. A pervasive computing application can benefit from knowing this information, for instance by providing the ability to adapt a user interface to the direction in which a user is standing or pointing. Our first motivating application is called the Wayfinder. We envision this application to run on a handheld computer and help sighted or blind people navigate toward a destination in an unfamiliar setting. For example, the Wayfinder might lead a visitor from the entry lobby of a building to the office of the person hosting the visitor, or to a seminar room. The Wayfinder gives incremental directions to the user on dynamically retrieved ("active") maps [Schilit, B., and Theimer, M., "Disseminating Active Map Information to Mobile Hosts." IEEE Network (September/October 1994), 22–32., Priyantha, N., Chakraborty, A., and Balakrishnan, H., "The Cricket Location-Support System." In *Proc. 6th ACM MOBICOM Conf.* (Boston, Mass., August 2000).], using the user's position and orientation with respect to a fixed set of wireless beacons placed throughout the building. The second motivating application is called the Viewfinder. The user can point it in any direction, and specify a "sweep angle" and maximum distance. Using an active map integrated with a resource discovery system (e.g., the Intentional Naming System, INS [Adjie-Winoto, W., Schwartz, E., Balakrishnan, H., and Lilley, J., "The Design and Implementation of an Intentional Naming System." in *Proc. ACM Symposium on Operating Systems Principles* (Kiawah Island, S.C., December 1999), pp. 186–201.]), the Viewfinder then retrieves and displays a representation of the set of devices and services lying inside the sector of interest specified by the user and allows the user to interact with these services via the representation on the map. A third motivating application is in the design of "augmented-reality" displays, where the user's view of the environment is overlaid with information about other objects present within that environment, and adapts to the direction that the user is looking toward [Azuma, R. Tracking requirements for augmented reality. *Comm. of the ACCM*, 7 (July 1993), 50–55.] [Turunen, T., Pyssyalo, T., and Lankila, T., "Utilization of Wireless Application Protocol to Implement Mobile Augmented Reality Based Services." In *Proc. W3C and WAP Workshop on Position Dependent Information Services* (February 2000). Available from http://wvv.v3.org/Mobile/posdep/Oulu.html.].

The underlying capability required for these applications is akin to a "software compass," which, endowed with a semantic map of its context and accurate knowledge of its own position and orientation, can inform the user of interesting resources and how to get to those resources. The design and implementation of the Cricket compass system, comprises a set of active beacons, passive hardware sensors, and associated software algorithms. This system enables a robust software compass capability for a handheld device moving about inside a building.

The operating environment in the Cricket architecture is instrumented with active beacons, each of which broadcasts its own known position over an RF channel together with an ultrasonic pulse [Priyantha, N., Chakraborty, A., and Balakrishnan, H., "The Cricket Location-Support System." In *Proc. 6th ACM MOBICOM Conf.* (Boston, Mass., August 2000).]. One RF receiver and several passive ultrasonic position receivers are precisely placed on a compass board. Software running on-board uses the differentials in distances reported by the ultrasonic receivers to infer the orientation (or "heading") of the device. The Cricket compass reports position and orientation indoors for a handheld, mobile device, and informs an application running on the device of the position and orientation in a local coordinate system established by the fixed set of beacons. Because the mobile device is passive in that it only receives and does not transmit signals, it need not announce its presence.

The first challenge in deriving orientation for a small device arises from the need for very accurate differential distance estimates: estimating orientation to within a few degrees of the correct value requires differential distance estimates to bellow sub-centimeter accuracy, which is at least an order of magnitude smaller than the currently best available linear distance estimation technologies. We show how to do this using multiple carefully placed receivers. The second challenge arises due to variation in the speed of sound due to temperature and humidity, which affects the accuracy of position estimates. Rather than explicitly measuring this parameter with climate sensors, we calculate it directly from observed propagation times.

The Cricket compass system presented here addresses several problems with existing methods for orientation estimation. A traditional magnetic compass can estimate orientation, but exhibits enormous errors when near magnetic or time-varying electric fields, both of which are rather common in most modern buildings with computers and other equipment. Orientation can be inferred from a moving position sensor, but this usually requires large or fast user motions, which is undesirable in several applications. Active sensors on user devices typically lead to systems that track users [Harter, A., Hopper, A., Steggles, P., Ward, A., and Webster, P., "The Anatomy of a Context-Aware Application." In *Proc. 7th ACM MOBICOM Conf.* (Seattle, Wash., August 1999), Want, R., Hopper, A., Falcao, V., and Gibbons, J., "The Active Badge Location System." *ACM Transactions on Information Systems* 10, 1 (January 1992), 91–102.], which suffer from potential compromises to user privacy [Privacy international survey: http://wvv.privacyinternational.org/survey/technologies.html., Priyantha, N., Chakraborty, A., and Balakrishnan, H. The Cricket Location-Support System. In *Proc. 6th ACM MOBICOM Conf.* (Boston, Mass., August 2000).]. In contrast, Cricket requires a small number of beacons at known positions in each room to instrument a building, but enables location and orientation for a passive handheld device without requiring any user motion. We have built several prototype beacons and a receiver compass configuration, and report experimental data that show that our software compass correctly estimates orientation to within a few degrees. We also describe a Viewfinder application developed using this capability. The Cricket system is being used in MIT's Project Oxygen in a variety of pervasive computing scenarios. Oxygen home page: http://oxygen.lcs.mit.edu.

2. Design of the Cricket Compass

Figure 1:
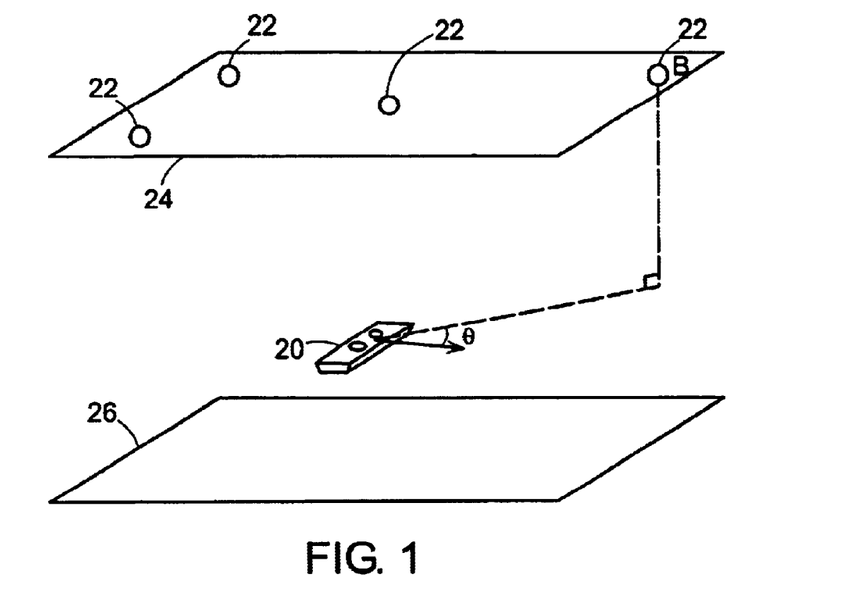
FIG. 1 illustrates a mobile unit within a room having beacons on the ceiling.

FIG. 1 shows a user device 20 with attached compass hardware in a room with beacons 22 placed on the ceiling 24 over a floor 26. When the device is held parallel to the horizontal plane, θ is the angle formed by the heading direction H, with the point where the perpendicular from beacon B intersects the horizontal plane. We are interested in precisely estimating θ.

The basic idea is to use one RF receiver to receive coordinate information from the beacons 22, and multiple, carefully placed, ultrasonic receivers on the compass attached to the device 20 to obtain the differential distance estimates of a beacon to each ultrasonic receiver. θ is a function of the differential distance of the linear distance of the compass from the beacon, and of the height of the beacon (ceiling) above the plane of the compass. We obtain per-beacon linear distance estimates by differencing the arrival times of coupled RF and ultrasonic signals sent from each beacon [Priyantha, N., Chakraborty, A., and Balakrishnan, H., "The Cricket Location-Support System." In *Proc. 6th ACM MOBICOM Conf.* (Boston, Mass., August 2000).]. To obtain the height of the beacon from the compass, we estimate the position coordinates of the compass from the position coordinates disseminated by multiple nearby beacons.

The rest of this section describes how this idea can be realized in practice. We start by describing how directional information can be obtained using differences in distance between a beacon and different receivers. We describe a technique to achieve the required precision of differential distance estimates, using differential phase information of the ultrasonic waves reaching the receivers. Finally, we show how to obtain accurate position coordinate information without explicit knowledge of the speed of sound, compensating for its variation with physical conditions.

2.1 Theory of Operation

Figure 2:
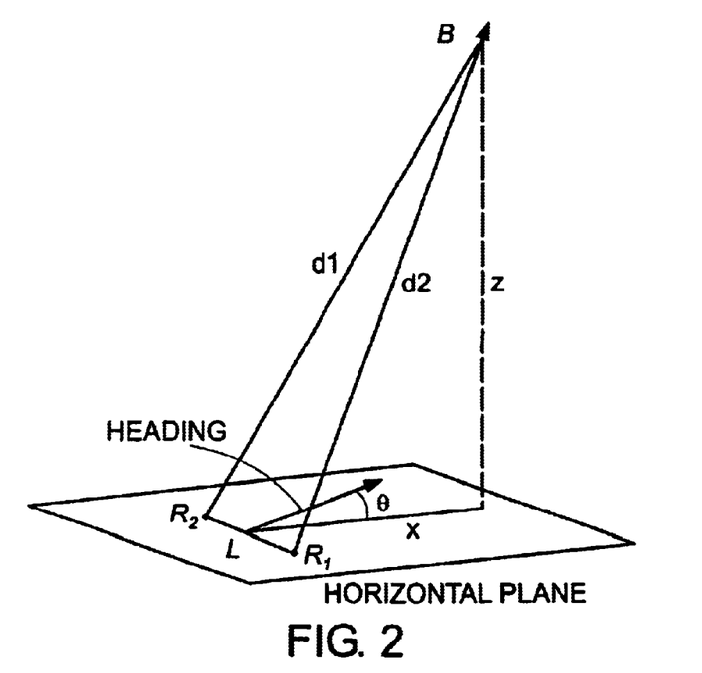
FIG. 2 illustrates the distances between a beacon on the ceiling and two receivers on the mobile unit.

FIG. 2 shows a beacon B, and a compass with two ultrasonic receivers, $R_1$ and $R_2$, which are located at a distance L apart from each other. The angle of rotation of the compass, θ, with respect to the beacon B, is related to the difference in distances $d_1$ and $d_2$, where $d_1$ and $d_2$ are the distances of receivers $R_1$ and $R_2$ from B. The vertical and horizontal distances from the center of the compass to B are denoted by z and x, respectively.

Figure 3:
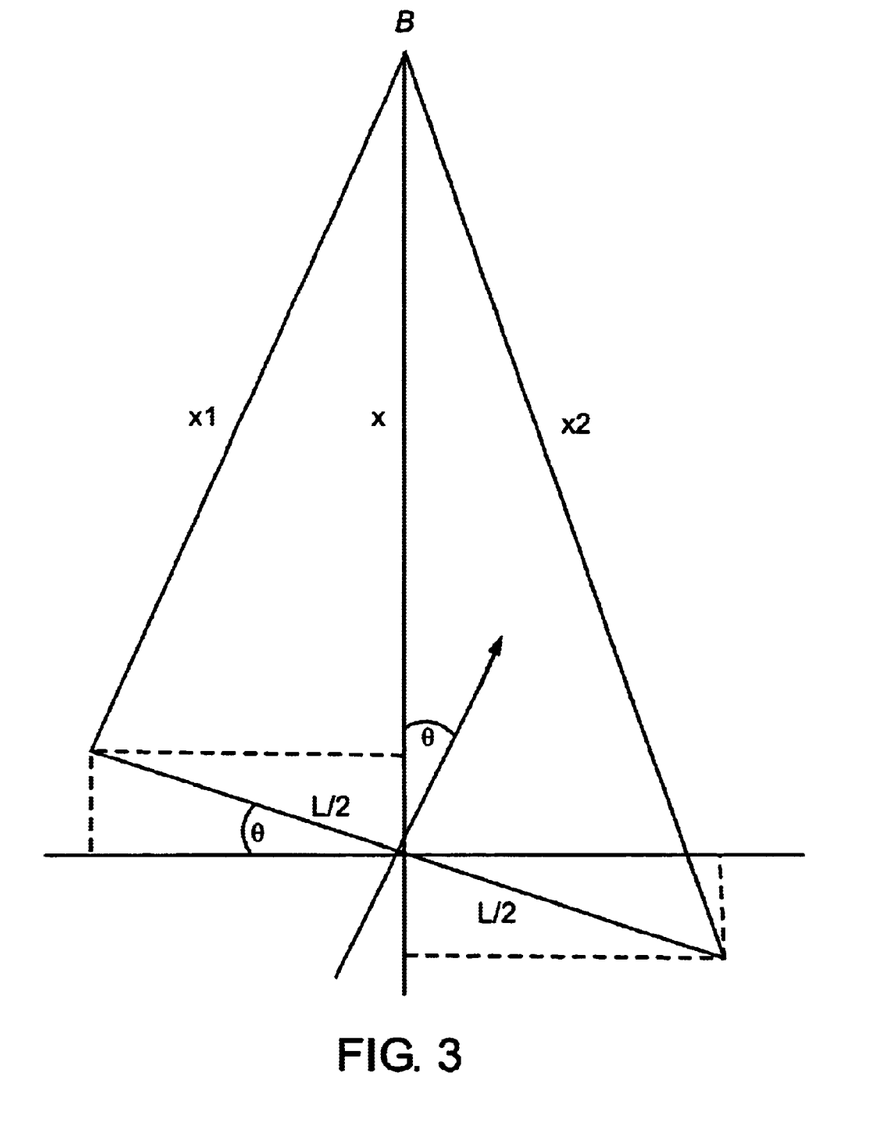
FIG. 3 shows the projection of the distances of FIG. 2 on a horizontal plane.

FIG. 3 shows the beacon B from FIG. 2 projected on to the horizontal plane along which the compass is aligned. In this figure, $x_1$ and $x_2$ are the projections of distances $d_1$ and $d_2$ on to the horizontal plane. We assume that the compass is held parallel to the horizontal plane.

From FIG. 2:

$$x_1^2 = d_1^2 - z^2 \qquad (1)$$

$$x_2^2 = d_2^2 - z^2 \qquad (2)$$

$$x = \sqrt{\bar{d}^2 - z^2}$$

where $\bar{d} \approx \dfrac{d_1 + d_2}{2}$ when $d_1, d_2 \gg L$.

From FIG. 3:

$$x_1^2 = \left(\frac{L}{2}\cos\theta\right)^2 + \left(x - \frac{L}{2}\sin\theta\right)^2 \text{ and}$$

-continued $$x_2^2 = \left(\frac{L}{2}\cos\theta\right)^2 + \left(x + \frac{L}{2}\sin\theta\right)^2 \Rightarrow x_2^2 - x_1^2 = 2Lx\sin\theta$$

Substituting for $x_1^2$ and $x_2^2$ from Equations (1) and (2), we get:

$$\sin\theta = \frac{d_2 + d_1}{2Lx} \cdot (d_2 - d_1) \qquad (3)$$

This may be rewritten as:

$$\sin\theta = \frac{d_2 - d_1}{L\sqrt{1 - \left(\frac{z}{\bar{d}}\right)^2}} \qquad (4)$$

Equation (4) implies that it suffices to estimate two quantities in order to determine the orientation of the compass with respect to a beacon: (i) $(d_2-d_1)$, the difference in distances of the two receivers from the beacon, and (ii) z/d, the ratio of the height of the beacon from the horizontal plane on which the compass is placed to the distance of the beacon from the center of the compass. In practice, however, no measurements are perfect. Our goal is to estimate each of these quantities with high precision, so as to produce a sufficiently accurate estimate of θ.

One way of precisely estimating $(d_2-d_1)$ would be to precisely measure $d_1$ and $d_2$ separately, but that is easier said than done. Consider, for example, a situation where L=5 cm, and θ=10°, with a beacon at a distance of 2 meters and a height of meter from the receivers. From Equation (4), the value of $(d_2-d_1)$ in this case is only ≈0.6 cm, which is about an order of magnitude smaller than what cur-rent technologies can achieve in terms of linear distance estimates [Harter, A., Hopper, A., Steggles, P., Ward, A., and Webster, P., "The Anatomy of a Context-Aware Application." In *Proc. 7th ACM MOBICOM Conf.* (Seattle, Wash., August 1999), Priyantha, N., Chakraborty, A., and Balakrishnan, H., "The Cricket Location-Support System." In *Proc. 6th ACM MOBICOM Conf.* (Boston, Mass., August 2000).]. The worst-case error in $(d_2-d_1)$ is equal to the sum of the errors in $d_1$ and $d_2$. Since our goal is to devise a compass with physically small dimensions, comparable in size to handheld PDAs, and still achieve high directional accuracy, we need an alternative method to estimate this differential distance.

Our solution to this problem tracks the phase difference between the ultrasonic signals at two different receivers and processes this information. We find that this approach allows us to obtain differential distance estimates with sub-centimeter accuracy. This is described in Section 2.2.

The second quantity, z/d, is estimated by determining the (x, y, z) coordinates of the compass with respect to the plane formed by the beacons (the xy plane). We do this by lacing multiple beacons in a room and estimating the time it takes for the ultrasonic signal to propagate between them and the compass. However, because the speed of sound varies with ambient temperature and humidity, we estimate this quantity as well. This is described in Section 2.3.

2.2 Estimating Differential Distance

Figure 4:
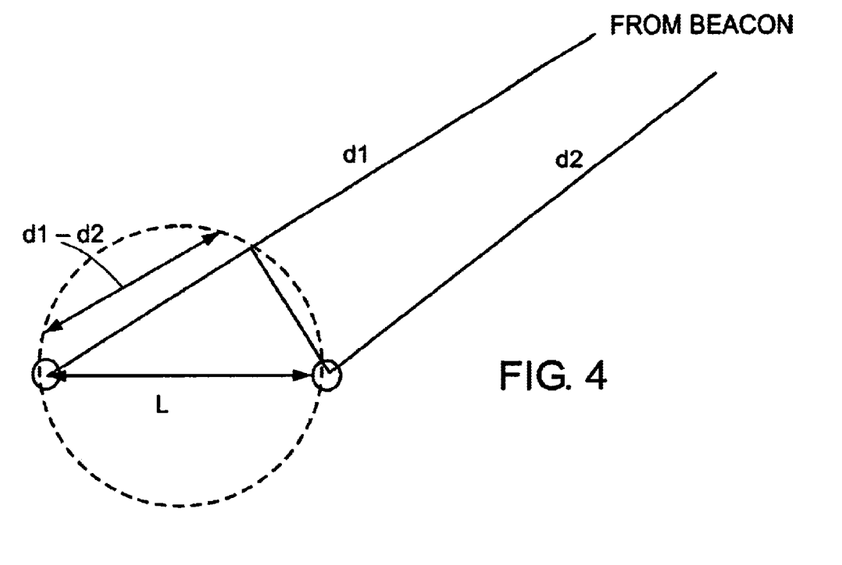
FIG. 4 illustrates the difference in distances from a beacon to two receivers on the mobile unit.

Consider two ultrasonic receivers $R_1$ and $R_2$ located a distance L apart, as shown in FIG. 4. Let $d_1$ and $d_2$ be the distances to receivers $R_1$ and $R_2$ from beacon θ. Let δd=$d_1$-$d_2$ and let $W_1$ and $W_2$ be the ultrasonic waveforms received by $R_1$ and $R_2$ from θ. The phase difference between the waveforms at the two receivers, φ, depends on the difference in distances traversed from θ to the receivers by the ultrasonic signal and the wavelength λ of the signal, and may be expressed as:

$$\phi = \frac{(\delta d)}{\lambda} \cdot 2\pi \qquad (5)$$

We call this the actual phase difference between the two signals and denote it by $\phi$.

Because it is difficult to correctly determine the start of periodic waveforms, we can only obtain estimates for a waveform's phase in the range $(-\pi, \pi)$ from repeated low-to-high transitions of the signal. Unfortunately, a given observed phase difference between two waveforms, $\alpha$, can correspond to an infinite number of actual phase differences, all separated by $2\pi$. This in turn leads to multiple possibilities for $\delta d$.

One way to solve this problem is to observe from Equation (5) that as long as $\delta d < \lambda/2$, $\phi = \alpha$, and there is no ambiguity. Since $d_1$, $d_2$, and L are three sides of a triangle, $L \leq |d_1 - d_2| = |\delta d|$, and we can therefore place the receivers at a distance $L < \lambda/2$ to unambiguously determine $\phi$ and therefore uniquely estimate $(d_1 - d_2)$.

For a 40 KHz ultrasonic waveform at a temperature of 25° C. and 50% humidity, $\lambda/2 = 4.35$ mm. This is smaller than the size of most available ultrasonic signal receivers, which are typically on the order of about 1 cm. Lowering the carrier frequency is not an option, since this would make it audible to humans. We therefore need a nice general method to place receivers to unambiguously determine the phase difference.

Figure 5:
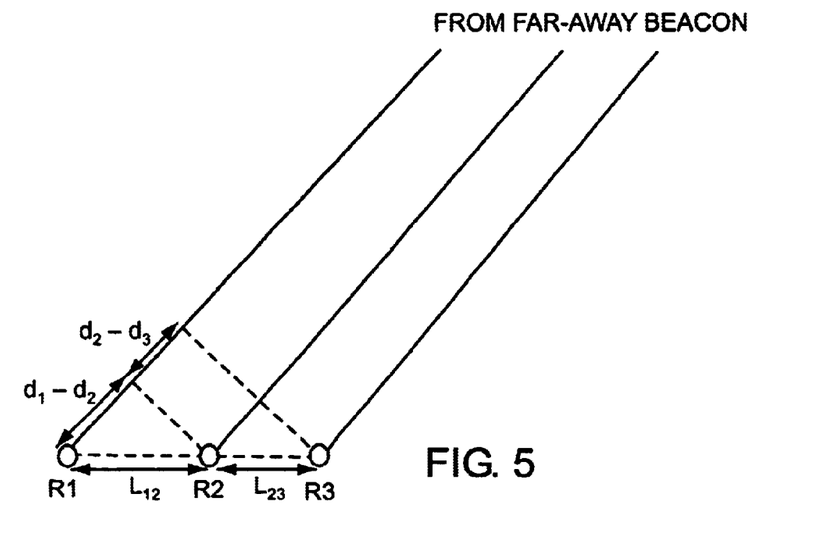
FIG. 5 illustrates the use of three receivers to remove multiple wavelength phase ambiguity found in FIG. 4.

One way of tackling this is to carefully place three receivers along a line, as shown in FIG. 5, and use a pair of observed phase differences to estimate an actual difference. The intuition is that if the two inter-receiver distances, $L_{12}$ and $L_{23}$ are chosen carefully, then the actual phase difference between receivers 1 and 2, for example, can be disambiguated by using the phase difference between receivers 2 and 3, since the two phase differences are not independent.

Let $\phi_{12}$ and $\phi_{23}$ be the actual phase differences of a beacon's waveform between receivers 1 and 2 and receivers 2 and 3, respectively. Then, $$\phi_{ij} = 2n_{ij}\pi + \alpha_{ij}$$

for each pair of receivers (i,j), where $n_{ij}$ are integers and $-\pi < \alpha_{ij} \leq \pi$. Because the actual phase difference between two receivers is proportional to the distance traversed by the signal from the beacon to each of the receivers, $\phi_{23}/\phi_{12} = (d_2 - d_3)/(d_1 - d_2) \approx L_{23}/L_{12}$ when $d_1 \gg L_{ij}$. This is shown in FIG. 5.

What we will show is that it is possible to pick $L_{12}$ and $L_{23}$ such that one can use two sets of observed phase differences $\alpha_{12}$, $\alpha_{23}$ to unambiguously estimate the actual phase difference $\phi_{12}$. In particular, we show the following result: If $L_{12}$ and $L_{23}$ are relatively prime multiples of $\lambda/2$, then it is possible to use $\alpha_{12}$ and $\alpha_{23}$ to unambiguously obtain the actual phase differences $\phi_{12}$ and $\phi_{23}$.

We argue this by contradiction. Suppose in fact there are two possible actual phase differences corresponding to a given observed phase difference for each receiver. For pair (i,j), call these differences $\phi'_{ij}$ and $\phi''_{ij}$. Then, the following sets of equations hold:

$$\phi'_{ij} = 2n'_{ij}\pi + \alpha_{ij}$$

$$\phi''_{ij} = 2n''_{ij}\pi + \alpha_{ij}$$

Since each observed $\phi_{12}$ is related to the corresponding $\phi_{23}$ by the ratio $L_{23}/L_{12}$, the above equations can be rewritten as:

$$2n'_{23}\pi + \alpha_{23} = (L_{23}/L_{12})(2n'_{12} + \alpha_{12}) \qquad (6)$$

$$2n''_{23}\pi + \alpha_{23} = (L_{23}/L_{12})(2n''_{12} + \alpha_{12}) \qquad (7)$$

Subtracting Equation (7) from Equation (6) and rearranging, we get:

$$L_{12}(n'_{23} - n''_{23}) = L_{23}(n'_{12} - n''_{12}) \qquad (8)$$

Let us express $L_{ij}$ as $l_{ij}\lambda/2$, which expresses the separation between receivers as an integral multiple of $\lambda/2$. Equation (8) is then equivalent to:

$$l_{12}(n'_{23} - n''_{23}) = l_{23}(n'_{12} - n''_{12}) \qquad (9)$$

where each of the $l_{ij}$ and $n_{ij}$ are integers.

Notice that $|n_{ij}|\lambda \leq \delta d$, the separation in distance between the carrier waveforms at receiver i and receiver j, and $\delta d \leq L_{ij} = l_{ij}\lambda/2$, for each pair $(i,j) = (1,2), (2,3)$. This means that $|(n'_{ij} - n''_{ij})\lambda| < 2L_{ij} = l_{ij}\lambda$. (In fact, $|(n'_{ij} - n''_{ij})\lambda|$ may be equal to $2L_{ij}$, but only if the beacon lies on the same horizontal plane as the compass. This situation is unlikely in practice, and detectable if it does occur.) Therefore, $|n'_{ij} - n''_{ij}| < l_{ij}$. Thus, if Equation (9) is to be satisfied, $l_{12}$ and $l_{23}$ cannot be relatively prime.

Hence, it is possible to unambiguously derive an actual phase difference $(\phi_{ij})$ in the range of $[0, L_{ij}]$ from an observed one $(\alpha_{ij})$ by picking $L_{12}$ and $L_{23}$ to be relatively prime integral multiples of $\lambda/2$. For example, we can pick $L_{12} = 2\lambda$ and $L_{23} = 1.5\lambda$. Thus, knowing $\phi$, we get the exact $\delta d$ needed for estimating θ in Equation (4).

2.2.1 Disambiguating θ

Figure 6:
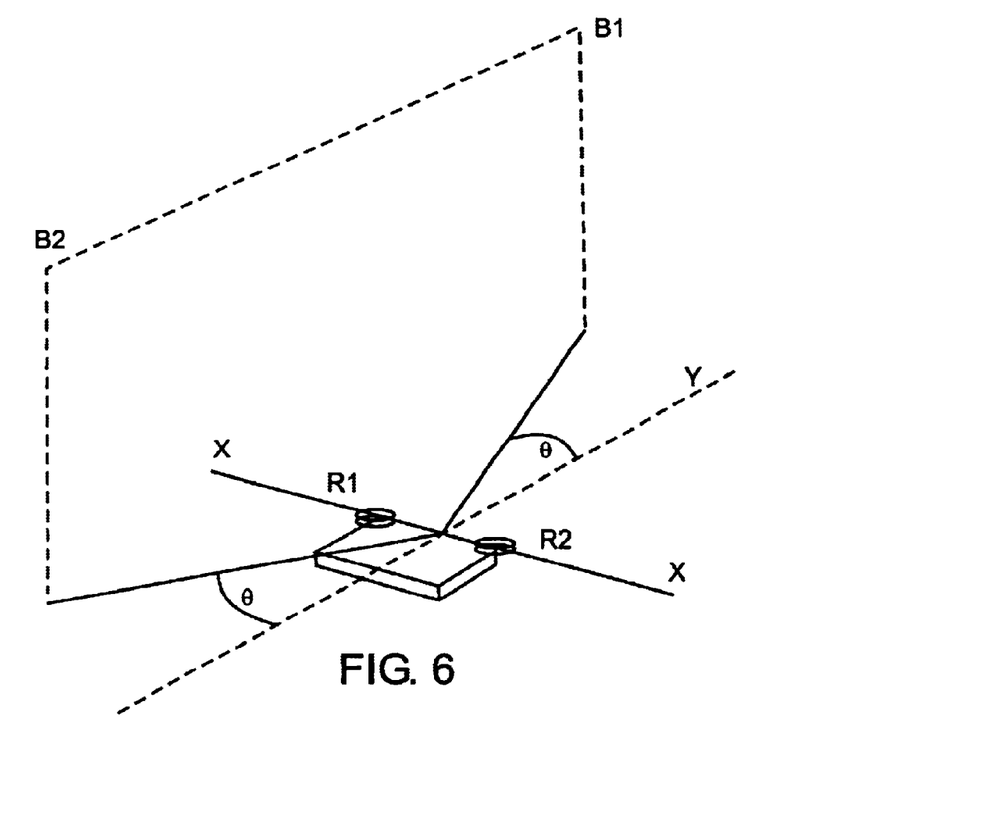
FIG. 6 illustrates angle ambiguity resulting from symmetry of the system.

Using Equation (4) and the techniques discussed thus far, we can determine sin θ between the compass and a particular beacon B. But as FIG. 6 shows, in general, there are two locations $B_1$, $B_2$ for a beacon B that result in the same θ at the compass. This is due to symmetry of the system about the line X—X. An analytical way of understanding this is to observe that there are two values of θ in the range $[0, 2\pi]$ for a given value of sin θ. This ambiguity in the location of the beacon prevents us from determining a unique value for the heading.

Figure 7:
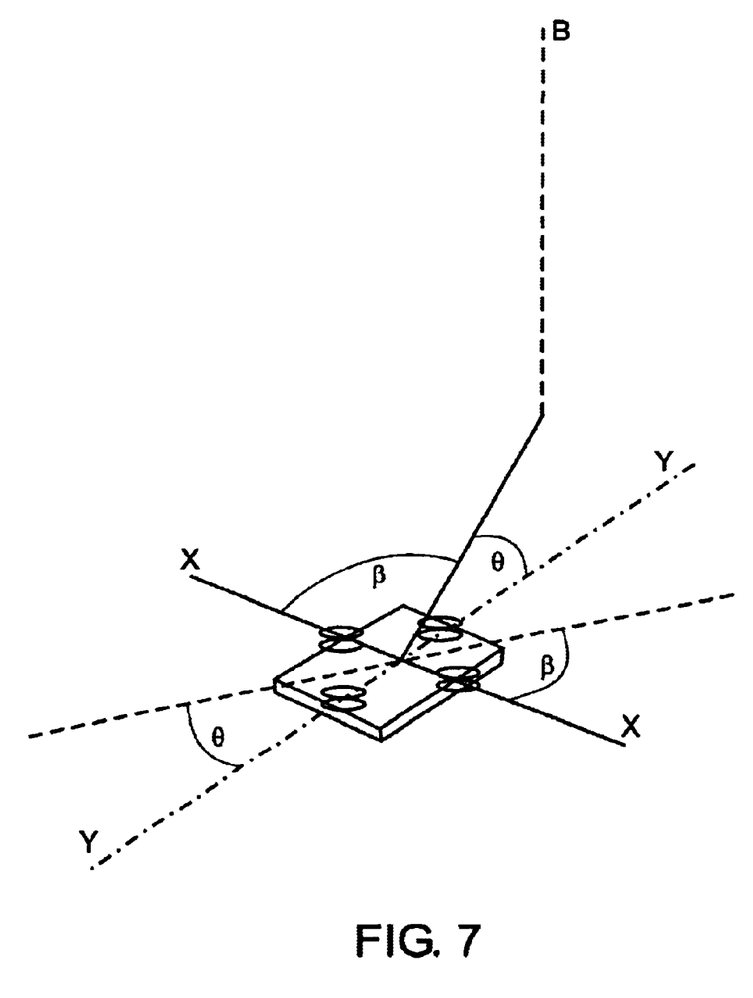
FIG. 7 illustrates the use of a perpendicular set of receivers to eliminate the ambiguity due to symmetry.
Figure 8:
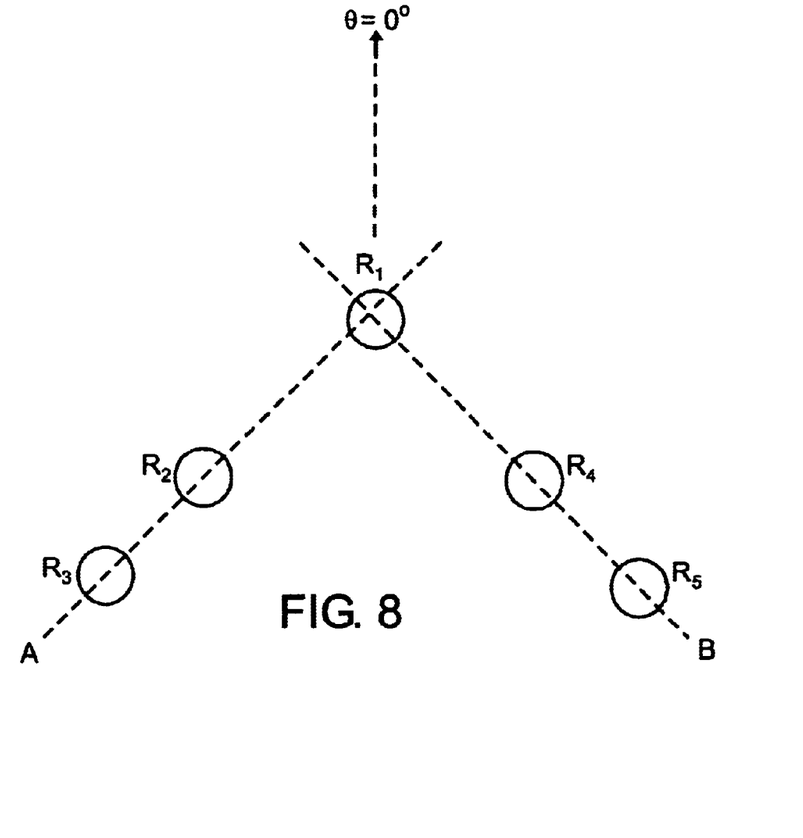
FIG. 8 illustrates an arrangement of receivers which eliminates ambiguity due to both multiple wavelengths and symmetry.

We solve this by using two sets of non-collinear receiver-triplets, to break the symmetry. We place the two sets of receiver-triplets perpendicular to each other as shown in FIG. 7 and there can now be only one position for the beacon B. We are now given an angle $\theta_1$ relative to X—X and $\theta_2$ relative to Y—Y which means that sin $\theta_1$ and sin $\theta_2$ are known. It is easy to see that there can only be a unique solution for this configuration. These two perpendicular sets of receiver-triplets are configured using five receivers on the compass, as shown in FIG. 8.

2.3 Determining Compass Coordinates

In the previous discussion we assumed that the receiver can determine the ratio of height to distance, $z/\bar{d}$, to a particular beacon. To enable the receiver to gather this information, we implement a coordinate system using a number of active beacons instrumented with known positions within the space. The compass determines its mean position as an (x,y,z) tuple by listening to beacon transmissions. This mechanism also enables us to determine the speed of sound in the vicinity of the compass.

Both the Bat and the Cricket systems use a combination of RF and ultrasound signals to measure distances, using the relative speeds between these two signals. However, to determine the distance accurately, it is necessary to know the speeds of both signals. The speed of RF is essentially infinite in our setting, but the speed of ultrasound depends on environmental factors such as temperature and humidity. The Bat system compensates for this variation by measuring environmental factors. The Cricket system is robust against such variation by virtue of its dependence only on relative distances.

We present a technique that enables us to determine the position in terms of (x,y,z) coordinates using four beacons without knowledge of the speed of sound or requiring additional environmental sensors. We use the measured propagation time $\hat{t}_i$ to each beacon, which is proportional to the actual distance $d_i$.

Figure 9:
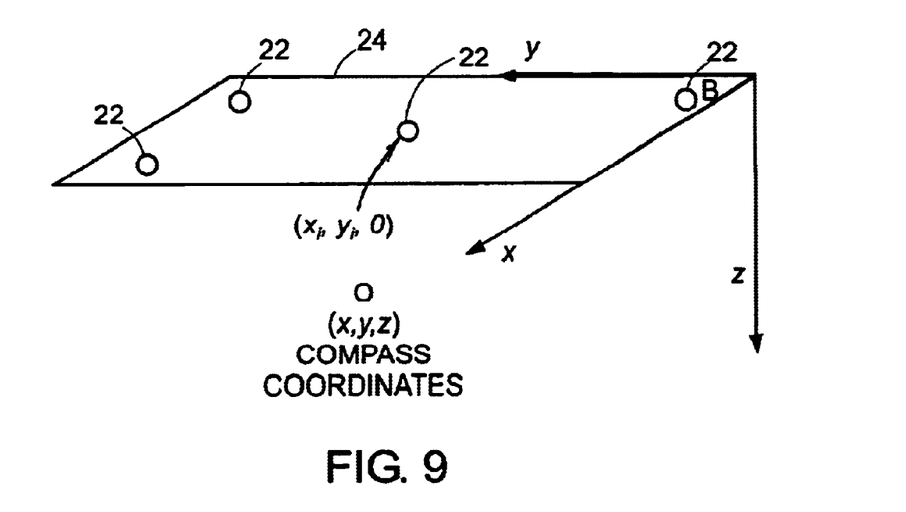
FIG. 9 illustrates an arrangement of beacons on the ceiling.

We implement a coordinate system within the room assuming the ceiling to be the x-y plane and z to be positive inside the room (downwards), as shown in FIG. 9. Consider four beacons $B_0$, $B_1$, $B_2$, and $B_3$ attached to the ceiling of a room. Each beacon $B_i$ broadcasts its coordinates ($x_i$, $y_i$, 0) on the RF channel, which is sensed by the receivers on the compass. At the same time, it also broadcasts an ultrasonic pulse. A receiver, which is at an unknown coordinate (x,y,z), measures the time difference $\hat{t}_i$ between the arrival of these two signals to beacon $B_i$. The actual distance from the receiver to $B_i$ is therefore equal to $v\hat{t}_i$, where v is the (unknown) speed of sound.

We can then write the following family of four equations for the unknowns (x,y,z,v). Recall that we are interested in the value of $z/\bar{d}=z/\sqrt{x^2+y^2+z^2}$ $$(x-x_i)^2+(y-y_i)^2+z^2=v^2\hat{t}_i^2, \quad 0\leq i\leq 3 \quad (10)$$

We can eliminate $z^2$ from these equations by subtracting each equation from the previous one, to obtain the following three linear equations in the three variables, x, y and $v^2$.

$$A \times \begin{bmatrix} x \\ y \\ v^2 \end{bmatrix} = \begin{bmatrix} x_1^2 - x_0^2 + y_1^2 - y_0^2 \\ x_2^2 - x_1^2 + y_2^2 - y_1^2 \\ x_3^2 - x_2^2 + y_3^2 - y_2^2 \end{bmatrix} \quad (11)$$

where the matrix A is given by $$A = \begin{bmatrix} 2(x_1-x_0) & 2(y_1-y_0) & (\hat{t}_1^2 - \hat{t}_0^2) \\ 2(x_2-x_1) & 2(y_2-y_1) & (\hat{t}_2^2 - \hat{t}_1^2) \\ 2(x_3-x_2) & 2(y_3-y_2) & (\hat{t}_3^2 - \hat{t}_2^2) \end{bmatrix}$$

If the determinant of A is non-zero, then Equation (11) can be solved to determine unique values for x, y, and $v^2$. Substituting these values into Equation (10) then yields a value for $z^2$, whose positive square root yields z. Furthermore, we can use this estimate of v, to further improve the accuracy of the $d_2-d_1$ estimation by using a better estimate of the wavelength of the ultrasonic carrier.

However, the ability to determine x, y, z, and $v^2$ uniquely from above set of equations depends on the values ($x_i$, $y_i$) for $0\leq i\leq 3$. Specifically, one can show that if the beacons $B_0,B_1,B_2$, and $B_3$ are placed such that they do not all lie on the same straight line or circle, then there is always a unique solution to the above set of equations. In practice, this placement can be done easily by placing four beacons on the corners of a rectangle and then by moving one of the beacons some distance along the diagonal of the rectangle. An example placement of the beacons is shown in FIG. 9.

Superficially, the equations above are similar to those used by GPS receivers to determine receiver position. In GPS, the beacons are satellites with precise clocks; latency from satellite to receiver is non-negligible; the propagation velocity is known (to first order) as the speed of light; and a system of equations is solved at the receiver to recover the receiver's absolute position and time. [Hoffmann-Wellenhof, B., Lichtenegger, H., and Collins, J., *Global Positioning System: Theory and Practice, Fourth Edition*. Springer-Verlag, 1997.] In contrast, in Cricket, propagation time (for RF) is negligible; the beacons have no clocks; and the propagation speed (for ultrasound) is unknown. Our system also solves for four unknowns, three of position and one for the speed of sound in the local medium.

3 Implementation

We have implemented prototypes of the beacon and compass hardware described in Section 2. Each beacon is configured with its position in a coordinate system, which it broadcasts on a 418 MHz RF channel. Concurrent with each periodic RE; broadcast, it sends 500 $\mu$s ultrasonic pulses at 40 KHz, which are received at the compass ultrasonic receivers. Each beacon and compass has an on-board PIC microcontroller that implements the communication protocol and processes information. The rest of this section describes the details of the communication protocol between the beacons and compass, and how the compass processes the observed differential distance estimates to deduce the actual differential distances.

3.1 Protocol Details

The beacons in Cricket operate in an autonomous manner, without any centralized control of when they transmit information [Priyantha, N., Chakraborty, A and Balakrishnan, H., "The Cricket Location-Support System." In *Proc. 6th ACM MOBICOM Conf.* (Boston, Mass., August 2000).]. To reduce inter-beacon interference at the receivers, each beacon senses the RF carrier before transmitting a locally unique ID and its known position coordinates. In addition, each subsequent transmission is sent at a uniformly chosen random time after the previous one. In our implementation, the average amount of time between successive transmissions is 250 ms. The packet format of the beacon includes information about the geographic space (e.g., an intentional name for resource discovery in INS [Adjie-Winoto, W., Schwartz, E., Balakrishnan, H. and Lilley, J., "The Design and Implementation of an Intentional Naming System." In *Proc. ACM Symposium on Operating Systems Principles* (Kiawah Island, S.C., December 1999), pp. 186–201.], a URL as in CoolTown [CoolTown: http://www.cooltown.hp.com/, 2000.], etc.). Each packet is protected using a block-parity code. The compass detects collision on the RF channel and discards samples that do not pass a block-parity check, which helps it disambiguate between potentially interleaved RF/ultrasound combinations sent of separate beacons.

The processing of ultrasonic signals is more involved. The compass hardware does analog-to-digital over sampling to detect low-to-high transitions from each ultrasonic receiver. In addition to processing RF information, the on-board PIC microcontroller handles the ultrasonic signals received by the several ultrasonic receivers on the compass to obtain phase difference estimates, and passes these to the software running on the attached device.

This software processes the raw data to obtain observed differential distance estimates, and then convert them to actual differential distance estimates. It also infers the coordinates of the compass relative to the coordinate system defined by the beacons, and computes the orientation unit vector in that system. It calculates the angle relative to each beacon and uses the smallest angle to derive the orientation vector. The reason for this will be clear from Section 4, which shows that the accuracy of our system worsens at large angles (greater than about 45 degrees). This also means that the system works best when it finds at least one beacon at an angle smaller than 45 degrees—since there are at least four beacons per space on each ceiling of interest, it is relatively straightforward to place, and find, at least one beacon in standard rectangular rooms.

3.2 Differential Distance Estimation Algorithm

In our prototype, the ultrasonic receivers are set up according to FIG. 8, where $L_{12}=L_{14}=2\lambda$, and $L_{23}=L_{45}=1.5\lambda$. An interesting aspect of our implementation is the method used to determine the unique actual differential distance from the observed differential distance. The method uses the intuition developed in Section 2.2, where an "existence" argument was made for how to configure receivers to unambiguously resolve the actual phase difference. Although the argument was made in the "phase domain," the results hold equivalently in the "wavelength domain," where the measured values are the differential distances in terms of $\lambda$. However, the argument in Section 2.2 is not prescriptive, so we outline our implemented algorithm below.

Figure 10:
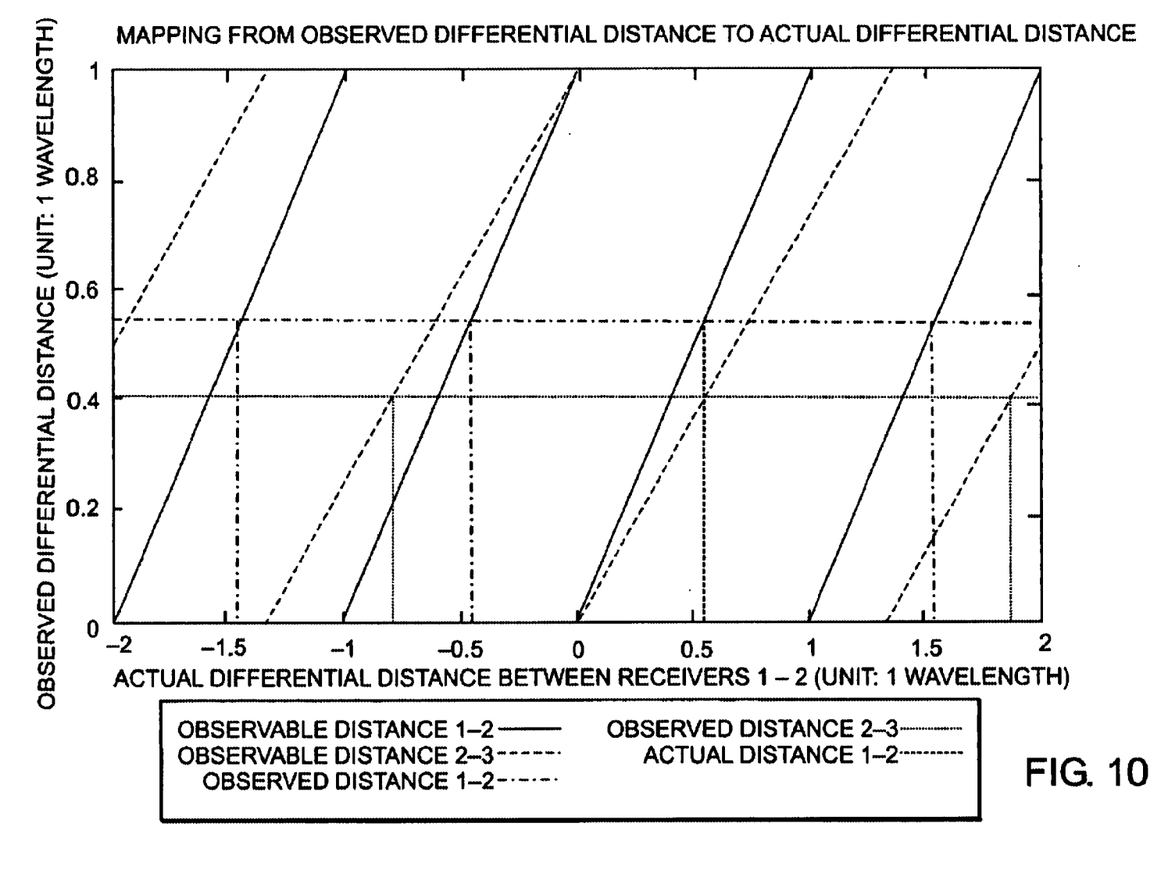
FIG. 10 illustrates a mapping from observed differential distance to actual differential distance.

Consider FIG. 10, which plots the variation of observed differential difference $\delta d'$ as a function of the actual differential difference $\delta d$ for two pairs of receivers. One of the curves (the solid line segments) shows the $\delta d'_{12}$ variation for the receiver pair $(R_1, R_2)$, which are separated by a distance $L_{12}=2\lambda$. The other curve (the dashed line segments) shows the variation $\delta d'_{23}$ for the receiver pair $(R_2, R_3)$ separated by $L_{23}=1.5\lambda$. We normalized the curves to show the observed variations of $\delta d'_{12}$ and $\delta d'_{23}$ as a function of $\delta d_{12}$; i.e., $\delta d'_{12}$ varies in the range $[0, \lambda]$ as $\delta d_{12}$ varies in $[-2\lambda, 2\lambda]$.

Each curve is periodic with discontinuities. The observed value $\delta d'$ varies in the range $[0, \lambda]$ because that is the range of measurable distance between two (time-shifted) waveforms whose starting times are not known. The discontinuities are due to the fact that the observable differential distances follow the periodicity of the observed phase differences. The actual differential distances vary in the range $[-L_{12}, L_{12}]$ for $\delta d_{12}$, and in the range $[-L_{23}, L_{23}]$ for $\delta d_{23}$. But because we have normalized the curves as a function of $\delta d_{12}$, the observed phase differential curve for the receiver pair $(R_2, R_3)$ shown in FIG. 10 also varies in the range $[-L_{23} \cdot L_{12}/L_{23}, L_{23} \cdot L_{12}/L_{23}] = [-L_{12}, L_{12}]$ in the plot each line segment is proportional to the normalized separation distance for that pair of receivers. Hence, the normalized curve for $(R_1, R_2)$ has a slope of 1, while the curve for $(R_2, R_3)$ has a slope of $L_{23}/L_{12}=3/4$, Note that because $L_{12}$ and $L_{23}$ are relatively prime multiples of $\lambda/2$, the periods (and discontinuities) for the two curves always differ, and the cycle of each curve (i.e., the discontinuities) do not overlap each other more than once. Consequently, the two curves do not have a repeating pattern within the interested range $[-L_{12}, L_{12}]$. Hence, we get a unique solution for the actual $\delta d$ value for any given pair of observed $\delta d'_{12}$ and $\delta d'_{23}$ values.

Recall that the range of observable differential distances is $[0, \lambda]$. From FIG. 10, we see that any observed value within this range can be mapped to four possible solutions for the actual $\delta d_{12}$. Let $A^{\delta d'_{12}}$ be the set of possible solutions derived from the observed value $\delta d'_{12}$. Graphically, these are the values on the horizontal axis extrapolated from the four intersections between the $y=\delta d'_{12}$ line and the observable differential distance curve for the receiver $(R_1, R_2)$. Then, given an observed $\delta d'_{12}$, our task is to identify the actual differential distance from the set $A^{\delta d'_{12}}$.

By following the arguments presented in Section 2.2, we can use the observed $\delta d'_{23}$ to help us identify the correct solution. From FIG. 10, the observed $\delta d'_{23}$ can be mapped to three possible solutions for the actual $\delta d_{12}$. Again, let $A^{\delta d'_{23}}$ be the set of possible solutions using the observed value $\delta d'_{23}$. Since we are guaranteed a unique solution for any given pair of observed values $\delta d'_{12}$ and $\delta d'_{23}$, we will find exactly one matching solution that exists in both $A^{\delta d'_{12}}$ and $A^{\delta d'_{23}}$. Thus, the final answer for the actual differential distance $A^{\delta d'_{12}}$ is $\alpha$ if and only if $\alpha \epsilon A^{\delta d'_{12}}$ and $\alpha \epsilon A^{\delta d'_{23}}$.

For example, FIG. 10 shows that for the observed $\delta d'_{12}=0.547$ and $\delta d'_{23}=0.41025$, $A^{\delta d'_{12}}=\{-1.453, -0.453, 0.547, 1.547\}$ and $A^{\delta d'_{12}}=\{-0.786, 0.547, 1.880\}$. Hence, the final solution is $\delta d_{12}=0.547$ because this value exists in both $A^{\delta d'_{12}}$ and $A^{\delta d'_{23}}$.

One caveat about this algorithm for finding the actual phase differential distance is that measurement errors may produce no matching solution that exists in both $A^{\delta d'_{12}}$ and an $A^{\delta d'_{23}}$. In such a situation, we find the closest matching solution by choosing an $a_{12} \epsilon A^{\delta d'_{12}}$ and $a_{23} \epsilon A^{\delta d'_{23}}$ such that $|a_{12}-a_{23}|$ is minimum. Then, we report the actual differential distance to be $$\frac{a_{12}+a_{13}}{2}.$$

3.3 Processing Flowchart

Figure 11A:
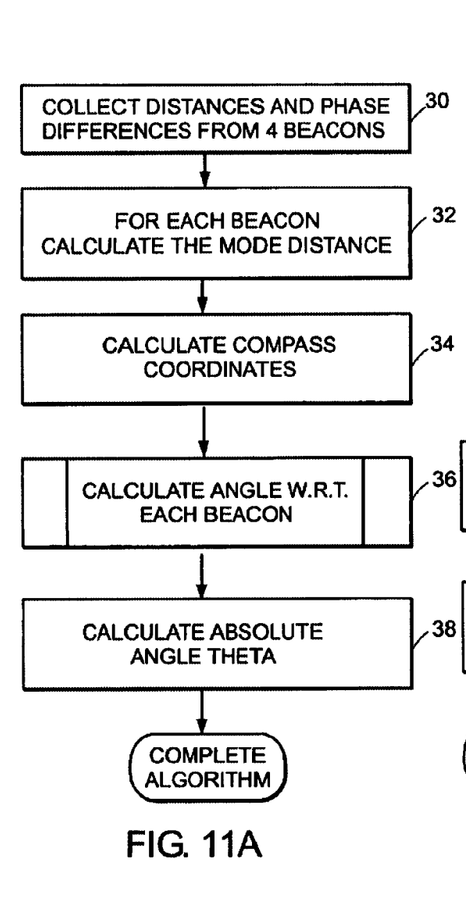
FIGS. 11A–C present a flowchart for computing the compass coordinates and orientation.
Figure 11B:
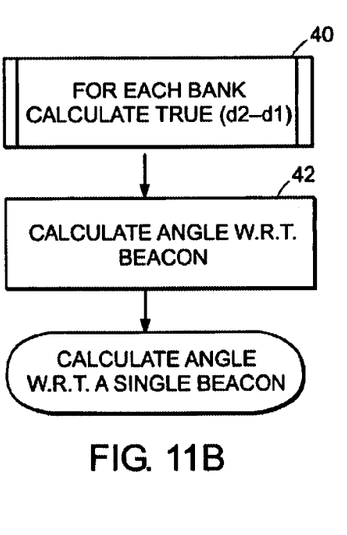
Figure 11C:
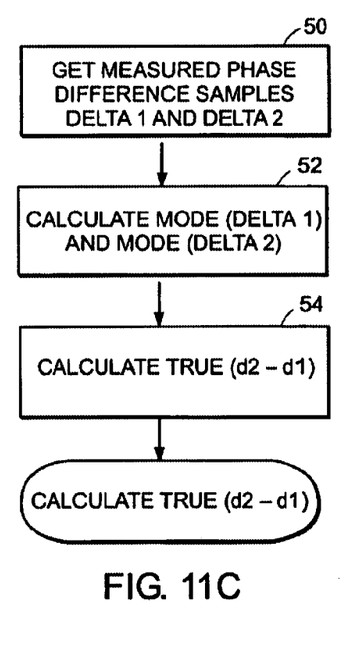

FIGS. 11A–C present a flowchart for computing the compass coordinates and orientation. In FIG. 11A, at 30, the distance from each beacon is determined from the differences in the arrival times of the radio frequency and ultrasonic signals, and the phase differences between adjacent ultrasonic receivers are collected. Data may be collected over a number of distinct transmissions.

Due to interference and the like, some of the data may not be good. From the several beacon transmissions, a mode distance is selected at 32 as the distance which occurs most from the multiple computations. From the distances with respect to each beacon and the beacon position information transmitted in the RF signals, the compass coordinates x, y and z can be calculated at 34. In particular, as discussed in section 2.3, equation 11 is solved to determine x, y and $v^2$, and those values are substituted into equation 10 to compute z.

An angle with respect to each beacon is then computed at 36, calling the subroutine of the FIG. 11B separately for each beacon. In FIG. 11B, at 40, a differential difference $d_2-d_1$ is computed for each of the two linear banks of receivers, calling the subroutine of FIG. 11C for each. In particular, with reference to FIG. 8, a first pass of the subroutine of FIG. 11C determines the differential distance of receivers $R_1$ and $R_2$ from the beacon, and a second pass of the subroutine of FIG. 11C computes the differential distance of receivers $R_1$ and $R_4$ from the beacon.

In FIG. 11C, at 50, the deltas corresponding, for example, to $\delta'_{12}$ and $\delta'_{23}$ in section 3.2, are taken from the phase differences collected in step 30. The mode delta value from the multiple samples collected is determined at 52. From those mode delta values, the differential distance is determined at 54 from FIG. 10.

Returning to FIG. 11B, the angle of the compass with respect to the single beacon is determined at 42 using equation 4 modified to allow for a single coordinate system from each of the banks of receivers. Referring to FIG. 8, receivers $R_1$, $R_2$, $R_3$ are referred to as bank A and receivers $R_1$, $R_4$, $R_5$ are referred to as bank B. A single coordinate system for both can be defined such that, for a beacon oriented vertically in FIG. 8, θ=0°. A beacon clockwise from that position would have a positive angle to 180°, and a beacon counterclockwise would have a negative angle to −180°.

Using the values ($d_2-d_1$) and (z/d) computed from measurements from bank A, two angles are computed:

$$\theta_{AI} = \arcsin\frac{d_2 - d_1}{L\sqrt{1-\left(\frac{z}{d}\right)^2}} - 45°$$

$$\theta_{A2}=(90°-\theta_{A1})$$

Using the values ($d_2-d_1$) and (z/d) computed from measurements from bank B, two other angles are computed:

$$\theta_{BI} = \arcsin\frac{d_2 - d_1}{L\sqrt{1-\left(\frac{z}{d}\right)^2}} + 45°$$

$$\theta_{B2}=(\theta_{B1}-90°)$$

The angles in the pairs ($\theta_{A1}$, $\theta_{B1}$), ($\theta_{A1}$, $\theta_{B2}$), ($\theta_{A2}$, $\theta_{B1}$) and ($\theta_{A2}$, $\theta_{B2}$) are then compared. Of those four pairs, the one in which the angles match with the minimum differential defines the orientation of the two banks in the coordinate system presented in FIG. 8.

Having computed the orientation with respect to each beacon using FIG. 11B, a single orientation value is provided at 38 in FIG. 11A. That single value may be taken as the smallest value, a mode value, or some least error value.

4 Improvements
4.1 Handling Reflections

Four appropriately placed beacons can accurately estimate the position coordinates of a receiver, but our results show that the accuracy degrades when a beacon is within a few inches from a wall. This is because ultrasound reflections can cause the measured distances to be inaccurate. If there is a line-of-sight path between the beacon and the receiver, we will have a single correct distance among the set of distances; if not, then several of the readings will be incorrect.

We can solve the ambiguity caused by multiple distances and errors due to incorrect distances by using five beacons instead of four. With five beacons, the receiver will have a set of readings containing multiple measured distances to each beacon. Now, from this set, the receiver can select four beacon values at a time, each value corresponding to a different beacon, and run the algorithm of Section 2.3 to determine its coordinate position. If the coordinates determined from two or more distinct sets of beacons are close to each other, we can select that as the correct coordinate. Otherwise, we cannot have much confidence in the correctness of the estimated coordinates (although they will likely be correct to a few inches).

Here, we essentially use the fifth beacon to validate the coordinates obtained using the other four, the robustness of this scheme is based on the assumption that the probability of two incorrect readings $\hat{d}_1$ and $\hat{d}_2$ giving rise to answers that coincide is negligible. An analogy might help understand why this is reasonable. Consider a line segment of length l joining two points, $P_1$ and $P_2$. We are told that a point in between them is at $d_1$ and $d_2$ away from $P_1$ and $P_2$ respectively. If both $\hat{d}_1$ and $\hat{d}_2$ are independent (and incorrect) estimates of $d_1$ and $d_2$, it is highly unlikely that the errored values will correspond to the same identical point.

4.2 Handling Diffractions

Another potential cause of error is the diffraction (bending at edges) of sound waves around obstacles. Such obstacles may not block the entire path but cause the signal to bend. If the signal arriving at the receiver is bent, then the measure angle to the beacon will have a corresponding error. The difference in distance due to bending could be on the order of millimeters, which will not be detected by the method described above since the error in the distance would be the same order of magnitude (or even less) than the accuracy of distance measurement itself.

However, the receiver can determine its orientation with respect to a fixed origin using each of the beacons it can hear from, and use values that coincide to be the right one. We intend to modify our current method of using the smallest angle and replace it with this "plurality" scheme.

4.3 Beacon and Compass Placement

One of the issues that a production-style deployment of the compass infrastructure must pay close attention to is beacon placement. From Equation 12, it is clear that the error is large when θ is large, and also when z is close to $\bar{d}$. What we would like is to ensure that, for every compass location, there is at least one beacon whose θ from that location is smaller than 45 degrees. In addition, we would also like to ensure that there is at least one visible beacon whose z/$\bar{d}$ is not bigger than some threshold value, say 0.5. This second condition means that there should beat least one beacon whose height does not "dominate" the distance to the compass, i.e., the compass should not be "directly under" all visible beacons.

For most rectangular rooms, these conditions are rather straightforward to meet without requiring a large number of beacons. In general, however, a more formal approach will be valuable to tackle this placement problem using ideas from the classical "art-gallery" problems and more recent "searchlight" problems in computational geometry. To our knowledge, constraints similar to our compass system have not been studied in the literature, and this area is open to interesting algorithm development, especially for non-rectangular rooms.

Some of the prior discussions assume (perhaps tacitly) that the compass is held flat and parallel to the ground. This is not a fundamental requirement; with this requirement, all we need is the orientation with respect to one beacon, while otherwise we need the orientation with respect to at least three beacons to uniquely determine the orientation vector. Since we have at least four beacons for coordinate determination, this is not hard to accomplish.

While this invention has been particularly shown and described with references to preferred embodiments thereof, it will be understood by those skilled in the art that various changes in form and details maybe made therein without departing from the scope of the invention encompassed by the appended claims.

What is claimed is:
1. A system for determining orientation of first and second units relative to each other comprising:
   a beacon on the first unit, transmitting a wave;
   plural receivers, each fixed relative to the second unit, the plural receivers sensing the transmitted wave to provide plural sensed signals of periodic waveforms; and
   a processor that processes the sensed signals to specify orientation in a 360° range of the second unit relative to the beacon based on phase differences between the periodic waveforms of the plural sensed signals that provide a differential distance measurement.

2. A system as claimed in claim 1 wherein the wave is an ultrasonic wave.

3. A system as claimed in claim 1 wherein the specified orientation includes angular orientation within a plane offset from the beacon.

4. A system as claimed in claim 3 wherein the plane is offset from a plane of plural beacons.

5. A system as claimed in claim 3 wherein the sensed signals are processed to specify orientation based on phase differences of sensed signals from plural beacons and on position relative to each of the plural beacons.

6. A system as claimed in claim 5 wherein the position is determined from measured distances relative to each of plural beacons.

7. A system as claimed in claim 5 comprising at least four beacons, the sensed signals being processed to solve for x, y and z position and for speed of sound.

8. A system as claimed in claim 7 wherein receivers are spaced at a length greater than a half wavelength of the transmitted wave, the system comprising at least three receivers, the sensed signals being processed to remove phase ambiguity of multiple phases separated by $2\pi$.

9. A system as claimed in claim 8 wherein the wave is an ultrasonic wave.

10. A system as claimed in claim 1 wherein receivers are spaced at a length greater than the half wavelength of the transmitted wave, the system comprising at least three receivers, the sensed signals being processed to remove phase ambiguity of multiple phases separated by $2\pi$.

11. A system as claimed in claim 10 wherein the at least three receivers are in a line spaced by distances that are relatively prime integral multiples of the half wavelength of the transmitted wave.

12. A system as claimed in claim 10 comprising two non-collinear sets of collinear receivers to break symmetry of the receivers.

13. A system as claimed in claim 12 wherein each set of receivers comprises three collinear receivers, the sets of receivers being perpendicular to each other and sharing one receiver.

14. A method of determining orientation of first and second units relative to each other comprising:
   from a beacon on the first unit, transmitting a wave;
   at each of plural receivers fixed relative to the second unit, sensing the transmitted wave to provide plural sensed signals of periodic waveforms; and
   processing the sensed signals to specify orientation in a 360° range of the plural receivers and of the second unit relative to the beacon based on phase differences between the periodic waveforms of the plural sensed signals that proved a differential distance measurement.

15. A system as claimed in claim 14 wherein the wave is an ultrasonic wave.

16. A method as claimed in claim 14 wherein the specified orientation includes angular orientation within a plane offset from the beacon.

17. A method as claimed in claim 16 wherein the plane is offset from a plane of plural beacons.

18. A method as claimed in claim 16 wherein the sensed signals are processed to specify orientation based on phase differences of sensed signals from plural beacons and on position relative to each of the plural beacons.

19. A method as claimed in claim 18 wherein the position is determined from measured distances relative to each of plural beacons.

20. A method as claimed in claim 18 wherein the sensed signals are from at least four beacons and are processed to solve for x, y and z position and for speed of sound.

21. A method as claimed in claim 20 wherein receivers are spaced at a length greater than a half wavelength of the transmitted wave, and the sensed signals are sensed by at least three receivers and are processed to remove phase ambiguity of multiple phases separated by $2\pi$.

22. A method as claimed in claim 21 wherein the wave is an ultrasonic wave.

23. A method as claimed in claim 14 wherein receivers are spaced at a length greater than a half wavelength of the transmitted wave, and the sensed signals are sensed by at least three receivers and are processed to remove phase ambiguity of multiple phases separated by $2\pi$.

24. A method as claimed in claim 23 wherein the last at least three receiver are in a line spaced by distances that are relatively prime integral multiples of the half wavelength of the transmitted wave.

25. A method as claimed in claim 23 wherein the sensed signals are from two non-collinear sets of collinear receivers to break symmetry of the receivers.

26. A method as claimed in claim 25 wherein each set of receivers comprise three collinear receivers, the sets of receivers being perpendicular to each other and sharing one receiver.

27. A system for determining orientation of first and second units relative to each other comprising:
   a beacon on the first unit, transmitting a wave;
   plural receivers, each fixed relative to the second unit, the plural receivers sensing the transmitted wave to provide plural sensed signals of periodic waveforms; and
   means for processing the sensed signals to specify orientation in a 360° range of the plural receivers and of the second unit relative to the beacon based on phase differences between the periodic waveforms of the plural sensed signals that provide a differential distance measurement.

28. A system for determining orientation of first and second units relative to each other comprising:
   a beacon on the first unit, transmitting a wave;
   at least three receivers, each fixed relative to the second unit, the receiver being spaced at a length greater than a half wavelength of the transmitted wave and sensing the transmitted wave to provide plural sensed signals of periodic waveforms; and
   a processor that processes the sensed signals to specify orientation of the second unit relative to the beacon based on phase differences between the periodic waveforms of the plural sensed signals, the sensed signals being processed to remove phase ambiguity of multiple phases separated by $2\pi$ independent of signal modulation.

29. A system as claimed in claim 28 wherein the at least three receivers are in a line spaced by distances that are relatively prime integral multiples of the half wavelength of the transmitted wave.

30. A system as claimed in claim 29 comprising two non-collinear sets of collinear receivers to break symmetry of the receivers.

31. A system as claimed in claim 30 wherein each set of receivers comprises three collinear receivers, the sets of receivers being perpendicular to each other and sharing one receiver.

32. A method of determining orientation of first and second units relative to each other comprising:

from a beacon on the first unit, transmitting a wave;

at each of at least three receivers fixed relative to the second unit and spaced at a length greater than a half wavelength of the transmitted wave, sensing the transmitted wave to provide plural sensed signals of periodic waveforms; and processing the sensed signals to specify orientation of the plural receivers and of the second unit relative to the beacon based on phase differences between the periodic waveforms of the plural sensed signals, the sensed signals being processed to remove phase ambiguity of multiple phases separated by $2\pi$ independent of signal modulation.

33. A method as claimed in claim 32 wherein the at least three receivers are in a line spaced by distances that are relatively prime integral multiples of the half wavelength of the transmitted wave.

34. A method as claimed in claim 33 wherein the sensed signals are from two non-collinear sets of collinear receivers to break symmetry of the receivers.

35. A method as claimed in claim 34 wherein each set of receivers comprises three collinear receivers, the sets of receivers being perpendicular to each other and sharing one receiver.

36. A system as claimed in claim 8 wherein phase ambiguity is removed independent of signal modulation.

37. A system as claimed in claim 10 wherein phase ambiguity is removed independent of signal modulation.

38. A method as claimed in claim 21 wherein phase ambiguity is removed independent of signal modulation.

39. A method as claimed in claim 23 wherein phase ambiguity is removed independent of signal modulation.

40. A system as claimed in claim 8 wherein the sensed pairs of signals received at each of respective pairs of receivers result in multiple potential solutions due to phase ambiguity that are resolved based on concurrence of solutions for multiple pairs.

41. A system as claimed in claim 10 wherein the sensed pairs of signals received at each of respective pairs of receivers result in multiple potential solutions due to phase ambiguity that are resolved based on concurrence of solutions for multiple pairs.

42. A system as claimed in claim 21 wherein the sensed pairs of signals received at each of respective pairs of receivers result in multiple potential solutions due to phase ambiguity that are resolved based on concurrence of solutions for multiple pairs.

43. A system as claimed in claim 23 wherein the sensed pairs of signals received at each of respective pairs of receivers result in multiple potential solutions due to phase ambiguity that are resolved based on concurrence of solutions for multiple pairs.

44. A system for determining orientation of first and second units relative to each other comprising:

a beacon on the first unit, transmitting a wave;

at least three receivers, each fixed relative to the second unit, the receivers being spaced at a length greater than a half wavelength of the transmitted wave and sensing the transmitted wave to provide plural sensed signals of periodic waveforms; and a processor that processes the sensed signals to specify orientation of the second unit relative to the beacon based on phase differences between the periodic waveforms of the plural sensed signals, the sensed signals being processed to remove phase ambiguity of multiple phases separated by $2\pi$, the sensed pair of signals received at each of respective pairs of receivers resulting in multiple potential solutions due to phase ambiguity that are resolved based on a concurrence of solutions from multiple pairs.

45. A system as claimed in claim 44 wherein the at least three receivers are in a line spaced by distances that are relatively prime integral multiples of the half wavelength of the transmitted wave.

46. A system as claimed in claim 44 comprising two non-collinear sets of collinear receivers to break symmetry of the receivers.

47. A system as claimed in claim 44 wherein each set of receivers comprises three collinear receivers, the sets of receivers being perpendicular to each other and sharing one receiver.

48. A method of determining orientation of first and second units relative to each other comprising:

a beacon on the first unit, transmitting a wave;

at each of at least three receivers fixed relative to the second unit and spaced at a length greater than a half wavelength of the transmitted wave, sensing the transmitted wave to provide plural sensed signals of periodic waveforms; and processing the sensed signals to specify orientation of the plural receivers and of the second unit relative to the beacon based on phase differences between the periodic waveforms of the plural sensed signals, the sensed signals being processed to remove phase ambiguity of multiple phases separated by $2\pi$, the sensed pair of signals received at each of respective pairs of receivers resulting in multiple potential solutions due to phase ambiguity that are resolved based on a concurrence of solutions from multiple pairs.

49. A method as claimed in claim 48 wherein the at least three receivers are in a line spaced by distances that are relatively prime integral multiples of the half wavelength of the transmitted wave.

50. A method as claimed in claim 48 wherein the sensed signals are from two non-collinear sets of collinear receivers to break symmetry of the receivers.

51. A method as claimed in claim 48 wherein each set of receivers comprises three collinear receivers, the sets of receivers being perpendicular to each other and sharing one receiver.

* * * * *

UNITED STATES PATENT AND TRADEMARK OFFICE
CERTIFICATE OF CORRECTION

PATENT NO. : 6,816,437 B1
DATED : November 9, 2004
INVENTOR(S) : Seth J. Teller et al.

It is certified that error appears in the above-identified patent and that said Letters Patent is hereby corrected as shown below:

Column 15,
Line 28, delete "the half" and insert -- a half --;
Line 53, delete "proved" and insert -- provide --;
Line 54, delete "system" and insert -- method --.

Column 16,
Line 16, delete "last";
Lines 16 and 44, delete "receiver" and insert -- receivers --;
Line 24, delete "comprise" and insert -- comprises --.

Column 17,
Line 51, delete "concurrence" and insert -- a concurrence --.

Signed and Sealed this

Eighth Day of February, 2005

JON W. DUDAS
*Director of the United States Patent and Trademark Office*